United States Patent [19]

Arahara et al.

[11] Patent Number: 4,972,200

[45] Date of Patent: Nov. 20, 1990

[54] IMAGE FORMING METHOD AND APPARATUS UTILIZING A VOLTAGE TO CHANGE THE ADHESIVENESS OF THE INK TO PERFORM AN INK CLEANING STEP

[75] Inventors: Kohzoh Arahara, Kawasaki; Osamu Hoshino, Ebina, both of Japan

[73] Assignee: Canon Kabushiki Kaisha, Tokyo, Japan

[21] Appl. No.: 325,986

[22] Filed: Mar. 20, 1989

[30] Foreign Application Priority Data

Mar. 24, 1988 [JP] Japan ............................... 63-071589

[51] Int. Cl.$^5$ ...................... G01D 15/16; G01D 15/06; B41F 7/00; G03G 21/00

[52] U.S. Cl. ................................ 346/1.1; 346/140 R; 346/150; 101/450.1; 355/296

[58] Field of Search ................. 346/1.1, 76 R, 76 PH, 346/134, 138, 135.1, 139 R, 140 R, 150, 153.1; 101/450.1, 463.1, 465, 466, 468, 467, 451, 453; 355/256, 258, 296; 118/659; 358/300; 106/20, 22

[56] References Cited

U.S. PATENT DOCUMENTS 2,892,709 6/1959 Mayer ............................ 346/153.1

4,068,588 1/1978 Nakano ............................... 101/451

4,080,897 3/1978 Gundlach ............................ 101/451

4,387,382 6/1983 Kohashi ....................... 346/140 PD 4,422,749 12/1985 Hoshino et al. .

4,702,988 10/1987 Fukumoto et al. .

4,745,030 5/1988 Arahara et al. .

4,789,617 12/1988 Arahara et al. .

4,838,940 6/1989 Kan ...................................... 106/22

*Primary Examiner*—Bruce A. Reynolds
*Assistant Examiner*—Scott A. Rogers
*Attorney, Agent, or Firm*—Fitzpatrick, Cella, Harper & Scinto

[57] ABSTRACT

An image forming method and apparatus is disclosed an ink capable of changing its adhesiveness corresponding to the polarity of a voltage applied thereto is provided. The ink is used for image formation by means of an image-forming apparatus with at least a pair of electroconductive members. The residual ink left between the pair of electroconductive members is removed by; and applying a voltage to the residual ink so as to reduce the adhesiveness of the ink disposed on one of the pair of electroconductive members, thereby to remove the ink from the electroconductive member and transfer it to another electroconductive member.

8 Claims, 1 Drawing Sheet

IMAGE FORMING METHOD AND APPARATUS UTILIZING A VOLTAGE TO CHANGE THE ADHESIVENESS OF THE INK TO PERFORM AN INK CLEANING STEP

FIELD OF THE INVENTION AND RELATED ART

The present invention relates to an image forming method including an ink cleaning step.

As peripheral equipment for recording used in conjunction with a computer, etc., there has been known various printers utilizing various recording systems, such as a laser beam printer, ink-jet printer, thermal transfer printer, wire dot printer and daisy-wheel printer.

With respect to such a recording system, our research group has proposed a recording method wherein a pattern of adhesiveness is chemically imparted to a specific ink, and recording is effected by utilizing the resultant difference between the adhesiveness and non-adhesiveness in the ink (Japanese Patent Application No. 175191/1986, corresponding to U.S. patent application Ser. No. 075,045).

This recording method comprises:

providing a fluid ink which is capable of forming a fluid layer, substantially non-adhesive and capable of being imparted with a adhesiveness on application of an energy, forming a layer of the fluid ink on an ink-carrying member, applying a pattern of the energy corresponding to a given image signal to the ink layer to form an adhesive pattern of the ink, and transferring the adhesive pattern of the ink to a transfer-receiving medium to form thereon an ink pattern corresponding to the energy pattern applied.

However, the above-mentioned recording method is not necessarily suitable for printing for mass-producing printed matter, in view of the printing cost, etc.

On the other hand, as the technique suitable for the mass-production printing, there have been known various printing processes such as planographic printing, letterpress printing, and gravure printing. Generally speaking, in these conventional printing process, ink is first applied to the surfaces of some inking rollers disposed in series to be formed into a sufficiently thin ink layer, which is then applied to a printing plate.

On the other hand, our research group has proposed a printing process wherein a voltage is applied to ink so as to change its adhesiveness, whereby a recording is effected (U.S. patent application filed on Jan. 24, 1989, corresponding to Japanese Patent Application Nos. 012617/1988, 070299/1988 and 251465/1988).

Incidentally, in the above-mentioned printing processes, when ink remaining on the inking roller surfaces after the completion of printing is not removed immediately, the ink is dried to stick the rollers to each other, whereby the next printing operation is obstructed. In the prior art, however, it has been difficult to completely remove the ink from the roller surface unless it is removed from the inking rollers manually (or by manual operations). Accordingly, it has been very troublesome to clean the inking roller of the ink after the completion of printing.

SUMMARY OF THE INVENTION

A principal object of the present invention is to provide an image forming method including an ink cleaning step which is capable of removing an ink remaining in an image-forming apparatus without hands or other manual operations.

According to the present invention, there, is provided an image forming method comprising the steps of: providing an ink capable of changing its adhesiveness corresponding to the polarity of a voltage to be applied thereto; subjecting the ink to image formation by means of an image-forming apparatus comprising at least a pair of electroconductive members, while leaving a residual ink between the pair of electroconductive members; and applying a voltage to the residual ink so as to reduce the adhesiveness of the ink disposed on one of the pair of electroconductive members, thereby to remove the ink from the electroconductive member.

The present invention also provides an image forming apparatus comprising: at least a pair of electroconductive members capable of carrying thereon an ink; and a power supply for applying a voltage between the pair of electroconductive members.

These and other objects, features and advantages of the present invention will become more apparent upon a consideration of the following description of the preferred embodiments of the present invention taken in conjunction with the accompanying drawing.

DETAILED DESCRIPTION OF THE INVENTION

Figure 1:
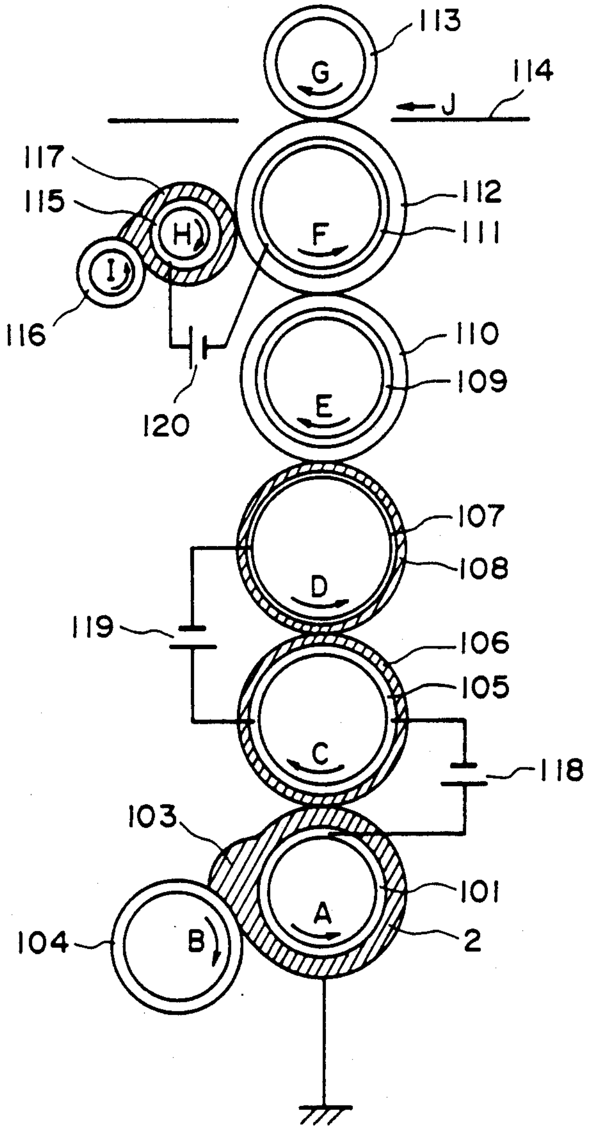
FIG. 1 is a schematic side sectional view of an apparatus for practicing the image forming method according to the present invention.

In the image forming method according to the present invention, there is utilized a property of an ink such that when a voltage is applied thereto by means of a pair of electrodes, the ink having an adhesiveness is caused not to adhere to the electrode. In the present invention, based on such property, the ink remaining in an image forming apparatus is removed from a prescribed electroconductive member.

Hereinbelow, the present invention is described with reference to the accompanying drawing.

Referring to the sole figure, an ink-carrying roller 101 is a cylindrical member rotating in the arrow A direction. The roller 101 may preferably comprise an electroconductive material such as aluminum, copper and stainless steel. Onto the cylindrical ink-carrying surface of the roller 101, an ink 2 as a recording material is supplied by means of a coating roller 104 rotating in the arrow B direction to be formed into a layer having a uniform thickness.

The cylindrical ink-carrying surface of the roller 101 may be composed of any material, as far as it is possible to form a desired layer of the ink 2 when it is rotated in the arrow A direction. More specifically, the roller surface may preferably be composed of a conductive material such as metal including stainless steel.

The surface composed of such a material of the ink-carrying roller 101 can be smooth but may preferably be a roughened one to an appropriate extent (e.g., a roughness of the order of 1S according to JIS B 0601) so as to enhance the conveying and carrying characteristics. The ink 2 is supplied to an ink reservoir 103 disposed between the ink-carrying roller 101 and the coating roller 104.

In contact with the ink layer 2 disposed on the ink-carrying roller 101, a first intermediate roller is disposed. The first intermediate roller 105 is rotated in the arrow C direction, which is counter to that of the ink-carrying roller 101, and at least a portion of the ink constituting the ink layer 2 is transferred to the first intermediate roller 105, whereby an ink layer 106 is formed on the surface of the first intermediate roller 105.

In contact with the ink layer 106 formed on the first intermediate roller 105, there is disposed a second intermediate roller 107 rotating in the arrow D direction, whereby an ink layer 108 is formed on the surface of the second intermediate roller 107. The first intermediate roller 105 and second intermediate roller 107 may preferably comprise an electroconductive material such as a metal including aluminum, copper, stainless steel, etc.

In contact with the ink layer 108 formed on the second intermediate roller 107, there is disposed a printing plate 110 wound about a plate roller 109 rotating in the arrow E direction. A portion of the ink layer 108 is transferred to the printing plate 110 corresponding to the image portion of the printing plate 110, thereby to form thereon an ink pattern. The printing plate 110 may be known one such as those for offset printing, gravure printing, letterpress printing, etc.

Further, the printing plate 110 can be one comprising an electroconductive portion and an insulating portion. In such a case, for example, a voltage may be applied between the printing plate 110 and the second intermediate roller 107 to convert the ink 2 to a non-adhesive state at the electroconductive portion of the plate 110, whereby the ink 2 is selectively attached to the insulating portion thereof.

The thus formed ink pattern on the printing plate 110 is then transferred to an electroconductive blanket 112, which rotates in the arrow F direction while contacting the printing plate 110 under pressure. Further, the ink pattern disposed on the blanket 112 is transferred to a recording medium (or a medium to be recorded) 114 such as a sheet of paper, cloth or metal, moving in the arrow J direction and passing between the blanket 112 and an impression roller 113, which rotates in the arrow G direction while contacting the blanket 112, whereby an image corresponding to the above-mentioned ink pattern is formed on the recording medium 114.

It is also possible that the ink pattern formed on the printing plate 110 is directly transferred to the recording medium 114 in some cases without providing the roller 111 or blanket 112. However, when the roller 111 and blanket 112 are provided, the printing plate 110 may be prevented from wearing or deteriorating on the basis of the material constituting the blanket 112, and an image having the same pattern as that of the printing plate 110 may be obtained on the recording medium 114.

Now, unless the ink layers formed on the first intermediate roller 105, second intermediate roller 107 and blanket 112 are removed after completion of the printing process, the ink layers are dried to obstruct the next printing process. In the present invention, the ink layers disposed on these members may be removed in the following manner, whereby the first intermediate roller 105, second intermediate roller 107 and blanket 112 may be cleaned.

First, the plate roller 109 (i.e., the printing plate 110) is caused not to contact the second intermediate roller 107, and both the second intermediate roller 107 and the first intermediate roller 105 are rotated while applying a voltage between these two rollers 105 and 107 so that the ink disposed on the side of the second intermediate roller 107 is converted into a non-adhesive state, whereby the ink disposed on the second intermediate roller 107 is moved or transferred to the first intermediate roller 105. In other words, in the present invention, a voltage is applied to an ink disposed between a pair of electrodes (i.e., electroconductive members) so that the ink adhesiveness is reduced on one electrode side, whereby the ink is successively or sequentially moved to be finally removed from a prescribed electrode.

Next, the first intermediate roller 105 is caused not to contact the second intermediate roller 07, and both the roller first intermediate 105 and the ink-carrying roller 101 are rotated while applying a voltage between these two rollers 105 and 101 so that the ink disposed on the side of the first intermediate roller 105 is converted into a non-adhesive state, whereby the ink layer 106 disposed on the first intermediate roller 105 is absorbed or incorporated into ink 2 disposed on the ink-carrying roller 101.

In the above-mentioned embodiment, a voltage is applied between the first intermediate roller 105 and the second intermediate roller 107, and between the first intermediate roller 105 and the ink-carrying roller 101 by means of power sources 119 and 118 respectively connected to these pairs of members, whereby the ink disposed on these intermediate rollers is removed (or recovered into the ink 2). However, it is possible to provide a power source (not shown) so as to connect the second intermediate roller 107 and the ink-carrying roller 101, thereby to successively remove the ink disposed o the second intermediate roller 107 and that disposed on the first intermediate roller 105. Further, it is also possible to dispose another roller for cleaning (not shown) in contact with the first intermediate roller 105 or the second intermediate roller 107, and to collect the ink to the cleaning roller by application of a voltage.

On the other hand, the blanket 112 may be cleaned by voltage application in a similar manner.

More specifically, the blanket 112 is caused not to contact the printing plate 110 and the pressure roller 113. After the completion of the printing process, the printing plate 110 may generally be removed from the plate roller 109 so that it may be replaced by another printing plate.

Then, the blanket 112 disposed on the blanket roller 111 is caused to contact an ink layer for cleaning 117 which has been formed on a cleaning roller 115 by means of a coating roller 116 to be used in combination with the cleaning roller 115. The ink constituting the ink layer for cleaning 117 may preferably be the same as the above-mentioned ink 2. The blanket roller 111 is rotated in the arrow F direction, the cleaning roller 115 is rotated in the arrow H direction, and the coating roller for cleaning 116 is rotated in the arrow I direction, and a voltage is applied between the blanket roller 111 and the cleaning roller 115 so that the ink disposed on the cleaning roller 115 side becomes adhesive and the ink disposed on the blanket roller 111 side becomes non-adhesive, whereby the ink remaining on the blanket roller 111 may be removed therefrom.

In the above-mentioned embodiment, an ink layer for cleaning 117 is formed on the cleaning roller 115 in advance. The reason for this is that the ink is patternwise disposed on the blanket 112 surface and when the cleaning layer 117 is not provided, the cleaning roller 115 directly contacts the blanket 112 without the medium of an ink layer in many portions and the wear thereof becomes considerable. The cleaning layer 117 to be provided on the cleaning roller 115 in advance is sometimes omissible, depending on the material for the cleaning roller 115 and/or blanket 112.

The above-mentioned voltages may be applied by means of a first DC power supply 118 connected to the electrodes of the ink-carrying roller 101 and the first intermediate roller 105; a second DC power supply 119 connected to the electrodes of the first intermediate roller 105 and the second intermediate roller 107; and a third DC power supply 120 connected to the electrodes of the blanket roller 111 and the cleaning roller 115.

The voltage applied from the above-mentioned power supply may practically be a DC voltage of 3–100 V, more preferably 5–80 V. In the present invention, it is preferred that the voltage from the power supply is applied between the rotation axes of the respective rollers.

Incidentally, while the adhesiveness of the ink disposed on the cathode side is reduced in the figure, the adhesiveness of the ink disposed on the anode side can be reduced depending on the kind of the ink.

The above-mentioned plate roller 109, blanket roller 111 and cleaning roller 115 may comprise an electroconductive material including a metal such as aluminum, copper and stainless steel. On the other hand, the blanket 112 may preferably comprise an electroconductive elastic (or elastomeric) material such as an electroconductive rubber.

The surfaces of the above-mentioned rollers 101, 105, 107, 111 and 115 can be smooth but may preferably be a roughened one to an appropriate extent (e.g., a roughness of the order of 1S according to JIS B 0601) so as to enhance the conveying and carrying characteristics.

The thickness of the layer of the ink 2 formed on the ink-carrying roller 101 can vary depending on various factors including the gap between the ink-carrying roller 101 and the coating roller 104 rotating in the arrow B direction, the viscosity of the ink 2, the surface material and roughness of the ink-carrying roller 101, and the rotational speed of the roller 101, but may preferably be about 0.001–100 mm, more preferably about 0.001–10 mm as measured at an ink transfer position where the roller 101 is disposed opposite to the first intermediate roller 105.

If the layer thickness of the ink is below 0.001 mm, it is difficult to form a uniform ink layer 2 on the ink-carrying roller 101. On the other hand, if the ink layer thickness exceeds 100 mm, it becomes difficult to convey the ink while keeping a uniform peripheral speed of the surface portion on the side contacting the first intermediate roller 105.

The ink 2 may preferably be an ink containing water (such as water-soluble ink or emulsion ink). Such an ink may be converted from an adhesive state to a non-adhesive state by the application of voltage, and may be used in the image forming method of the present invention.

Hereinbelow, there will be described an ink to be used in the image forming method including a cleaning step according to the present invention.

In the present invention, there may be utilized some embodiments as follows, with respect to the mechanism wherein an adhesive ink is converted into a non-adhesive state under the application of a voltage.

(1) An embodiment wherein the adhesiveness of an ink is changed on the basis of Coulomb force under voltage application.

In such an embodiment, an ink basically comprising inorganic or organic fine particles and a liquid dispersion medium is used, and a difference in chargeability of the fine particles is utilized.

More specifically, in the case where an ink is prepared so that negatively chargeable fine particles (i.e., those capable of being easily charged negatively) are contained in the ink, the ink on the cathode side becomes non-adhesive to the cathode when a voltage is applied to the ink. In a case where an ink is prepared so that positively chargeable fine particles (i.e., those capable of being easily charged positively) are contained in the ink, the ink on the anode side becomes non-adhesive to the anode when a voltage is applied to the ink.

(2) An embodiment wherein ink is subjected to electrolysis to generate a gas on the basis of electric conduction due to voltage application, whereby the adhesiveness of the ink is changed.

In such an embodiment, an ink is prepared so that it is caused to generate a gas in the neighborhood of one electrode under voltage application, whereby the ink becomes non-adhesive to the electrode due to the gas.

In order to cause the ink to generate a gas due to electrolysis, a solvent such as water, alcohol and glycol; or a solvent containing an electrolyte such as sodium chloride and potassium chloride dissolved therein, is contained in the ink. The electric resistance of the ink may preferably be as low as possible. More specifically, the volume resistivity of the ink may preferably be $10^5$ ohm.cm or below, more preferably $10^4$ ohm.cm or below. If the volume resistivity exceeds $10^5$ ohm.cm, the quantity of electric conduction becomes too small, or a high voltage is required in order to prevent a decrease in the quantity of electric conduction.

(3) An embodiment wherein a crosslinked structure of an ink or a dissociative state of an electrolyte contained therein is changed by an electrochemical reaction on the basis of electric conduction due to voltage application, whereby the adhesiveness of the ink is changed.

In such an embodiment, at least a part of the crosslinked structure of the ink is changed or destroyed, whereby the ink is imparted with a non-adhesiveness. Alternatively, the dissociative state of the electrolyte constituting the ink is changed whereby the ink is imparted with a non-adhesiveness.

In the present invention, it may be considered that the mechanism of the change in the ink from an adhesive state to a non-adhesive state is any one of the above-mentioned three mechanisms (1), (2) and (3). It is possible that the mechanism of the image-forming method according to the present invention is a combination of two or more of the above-mentioned three mechanisms.

Incidentally, with respect to a portion of an ink layer supplied with a voltage, almost the whole ink layer along the thickness direction is transferred to a prescribed electroconductive member (hereinafter such transfer of an ink is referred to as "bulk transfer").

Hereinbelow, there is described an ink wherein the adhesiveness is changed by the above-mentioned mechanism (1) and (2).

If the ink used in the present invention is a liquid having a low viscosity such as water and alcohol, the cohesive force is weak, whereby it is difficult to obtain a suitable adhesiveness.

More specifically, the ink used in the present invention may preferably satisfy at least one of the following properties. (1) Adhesiveness A sample ink (reflection density: 1.0 or larger) is caused to adhere to a stainless steel plate of 1 cm×1 cm in size coated with platinum plating which is vertically disposed, so that a 2 mm-thick ink layer is formed on the stainless steel plate, and is left standing as it is for 5 sec. in an environment of a temperature of 25° C. and a moisture of 60%. Then, the height of the ink layer is measured. Through the measurement, the ink used in the present invention may preferably be held on the stainless steel plate substantially. More specifically, the above-mentioned height of the ink layer may preferably be 50% or more, more preferably 80% or more, based on the original height thereof. (2) Adhesiveness under no voltage application A 2 mm-thick layer of a sample ink is sandwiched between two stainless steel plates each of 1 cm×1 cm in size coated with platinum plating which are vertically disposed, and the stainless steel plates are separated from each other at a peeling speed of 5 cm/sec under no voltage application. Then, the areas of both plates covered with the ink are respectively measured. Through the measurement, in the ink used in the present invention, the respective plates may preferably show substantially the same adhesion amount of the ink. More specifically, each plate may preferably show an area proportion of 0.7–1.0, in terms of the proportion of the area measured above to the area of the plate which has originally been covered with the above-mentioned 2 mm-thick ink layer. (3) Adhesiveness under voltage application A sample ink (reflection density: 1.0 or larger) is applied on a stainless steel plate of 1 cm×1 cm coated with platinum plating to form an about 2 mm-thick ink layer, and another stainless steel plate coated with platinum plating having the same size as described above is, after the reflection density thereof is measured, disposed on the ink layer, and these two stainless steel plates are vertically disposed. Then, a voltage of 30 30 V was applied between the above-mentioned two stainless steel plates sandwiching the 2 mm-thick ink layer, while one of the stainless steel plate is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the reflection density of each stainless steel plate surface is measured to determine the increase in reflection density of the stainless steel plate. Through the measurement, in the ink used in the present invention, it is preferred that the coloring content of the ink is not substantially transferred to one of the above-mentioned two electrode, and the ink selectively adheres to the other electrode. More specifically, with respect to the electrode to which substantially no ink adheres, the increase in the reflection density may preferably be 0.3 or smaller, more preferably 0.1 or smaller, when the above-mentioned ink per se has a reflection density of 1.0 or larger.

The ink used in the present invention of which adhesiveness is changed by the above-mentioned mechanism (1) and (2) basically comprises inorganic or organic fine particles and a liquid dispersion medium. The fine particles contained in the ink improve the cutting of the ink and enhance the image resolution provided thereby. The ink material used in the present invention is an amorphous solid and is a non-Newtonian fluid with respect to its fluidity.

When the ink adhesiveness is changed due to Coulomb force, charged or chargeable fine particles may be used as the entirety or a part of the above-mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2Si_2O5$, mesortisilicic acid $H_4Si3O3$, mesotetrasilicic acid $H_6Si_4O11$; polyamide resin particles; polyamide-imide resin particles; etc.

Examples of the particles to be supplied with a negative charge may include: iron hydroxide particles, aluminum hydroxide particles, fluorinated mica particles, polyethylene particles, montmorillonite particles, fluorine-containing resin particles, etc.

Further, polymer particles containing various charge-controlling agents used as electrophotographic toners (positively chargeable or negatively chargeable) may be used for such purpose.

The above-mentioned fine particles may generally have an average particle size of 100 microns or smaller, preferably 0.1–20 microns, more preferably 0.1–10 microns. The fine particles may generally be contained in the ink in an amount of 1 wt. part or more, preferably 3–90 wt. parts, more preferably 5–60 wt. parts, per 100 wt. parts of the ink.

Examples of the liquid dispersion medium used in the present invention may include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, γ-butyrolactone, propylene carbonate 1,2,6-hexanetriol, dipropylene glycol, hexylene glycol, etc. These compounds may be used singly or as a mixture of two or more species as desired. The liquid dispersion medium may preferably be contained in an amount of 40–95 wt. parts, more preferably 60–85 wt. parts, per 100 wt. parts of the ink.

In a preferred embodiment of the present invention, in order to control the viscosity of the ink, a polymer soluble in the above-mentioned liquid dispersion medium may be contained in an amount of 1–90 wt. parts, more preferably 1–50 wt. parts, particularly preferably 1–20 wt. parts, per 100 wt. parts of the ink material.

Examples of such polymer include: plant polymers, such as guar gum, locust bean gum, gum arabic, tragacanth, carrageenan, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and liquid polymer such as polybutene.

In a case where the adhesiveness of the ink is changed by the generation of a gas due to electrolysis, the liquid dispersion medium may preferably comprise: water, an alcohol such as methanol and ethanol; a solvent having a hydroxyl group such as glycerin, ethylene glycol and propylene glycol; or a solvent wherein an electrolyte such as sodium chloride and potassium chloride is dissolved. The contents of the liquid dispersion medium and fine particles are the same as those described above.

Particularly, water or an aqueous solvent may preferably be used as the liquid dispersion medium, because hydrogen is liable to be generated at the cathode side. When water and another liquid dispersion medium are mixed, the water content may preferably be 1 wt. part or more, more preferably 5–99 wt. parts, per 100 wt. parts of the ink.

In the case of the ink capable of generating a gas due to electrolysis, the fine particles contained in the ink may preferably be, e.g., silica, carbon fluoride, titanium oxide or carbon black, in addition to those as described hereinabove.

In a preferred embodiment of the present invention, in view of the viscoelastic characteristic of the ink, the entirety or a part of the fine particles comprise swelling particles (i.e., particles capable of being swelled) which are capable of retaining the above-mentioned liquid dispersion medium therein.

Examples of such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica and Li-taeniolite; synthetic mica, silica, etc.

The above-mentioned fluorinated mica may be represented by the following general formula (1).

$$W_{1-1/3}(X,Y)_{2.5-3}(Z_4O_{10})F_2 \quad (1)$$

wherein W denotes Na or Li; X and Y respectively denote an ion having a coordination number of 6, such as $Mg^{2+}$, $Fe^{2+}$, $Ni^{2}$, $Mu^{2+}$, $Al^{3+}$, and $Li^{+}$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in its dry state, may preferably have an average particle size of 0.1–20 microns, more preferably 0.8–15 microns, particularly preferably 0.8–8 microns. The content of the swelling particles can be the same as that described above with respect to the fine particles, but may more preferably be 8–60 wt. parts per 100 wt. parts of the ink. It is also preferred to use swelling particles having a charge on their surfaces.

The ink used in the present invention may contain as desired, a colorant comprising a dye or pigment generally used in the field of printing or recording, such as carbon black. When the ink contains a colorant, the colorant content may preferably be 0.1–40 wt. parts, more preferably 1–20 wt. parts, per 100 wt. parts of the ink. Instead of or in combination with the colorant, a color-forming compound capable of generating a color under voltage application can be contained in the ink. The ink may further contain an electrolyte capable of providing electroconductivity to the ink, a thickening agent (or viscosity improver), a viscosity-reducing agent, or a surfactant. It is also possible to cause the above-mentioned fine particles per se to function as a colorant.

In order to obtain an ink used in the present invention, a liquid dispersion medium and fine particles as mentioned above may for example be mixed in an ordinary manner.

Next, there is described an ink of which adhesiveness in changed by the above-mentioned mechanism (3).

The ink used in the present invention may comprise a crosslinked substance (inclusive of polyelectrolyte) impregnated with a liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing an inorganic ion such as borate ion, and the additive. Further, the term "crosslinked structure" refers to a three-dimensional structure having a crosslinkage or crosslinking bond. The crosslinkage may be composed of any one or more of covalent bond, ionic bond, hydrogen bond and van der Waal's bond.

In the ink used in the present invention, the crosslinked structure is only required to be such that a desired degree of liquid dispersion medium-retaining property is given thereby. More specifically, the crosslinked structure may be any one of a network, a honeycomb, a helix, etc., or may be an irregular one.

The liquid dispersion medium in the ink used in the present invention may be any inorganic or organic liquid medium which is liquid at room temperature. The liquid medium should preferably have a relatively low volatility, e.g., one equal to or even lower than that of water.

In case where a hydrophilic dispersion medium such as water and an aqueous medium is used as the liquid dispersion medium, the crosslinked substance may preferably be composed of or from a natural or synthetic hydrophilic high polymer or macromolecular substance.

Examples of such polymer include: plant polymers, such as guar gum, locust bean gum, gum arabic, tragacanth, carrageenan, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

The hydrophilic polymer may preferably be used in a proportion of 0.2–50 wt. parts, particularly 0.5–30 wt. parts, with respect to 100 wt. parts of the liquid dispersion medium.

In the ink used in the present invention, a polyelectrolyte may preferably be used as the above-mentioned crosslinked substance. The "polyelectrolyte" used herein refers to a polymer or macromolecular substance having a dissociative group in the polymer chain (i.e., main chain or side chain) thereof.

Examples of the polyelectrolyte capable of providing a poly ion when dissociated in water may include, e.g., natural polymers such as alginic acid and gelatin; and synthetic polymers obtained by introducing a dissociative group into ordinary polymers, such as polystyrenesulfonic acid and polyacrylic acid. Among these polyelectrolytes, an amphoteric polyelectrolytes capable of being dissociated as either an acid or a base, such as a protein may preferably be used, in order to obtain a desired change in the ink adhesiveness based on electric conduction.

On the other hand, when oil such as mineral oil or an organic solvent such as toluene is used as the liquid dispersion medium, the crosslinked substance may be composed of or from one or a mixture of two or more compounds selected from metallic soaps inclusive or metal stearates, such as aluminum stearate, magnesium stearate, and zinc stearate, and, similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters. These crosslinked substances may be used in the same manner as the above-mentioned hydrophilic polymers.

When the hydrophilic polymer, polyelectrolyte or metallic soap, etc., is used, the layer-forming property and liquid dispersion medium-retaining ability of the resultant ink vary to some extent depending on the formulation of these components or combination thereof with a liquid dispersion medium. It is somewhat difficult to determine the formulation o composition of these components in a single way. In the present invention, in order to obtain an ink having an adhesiveness, it is preferred to increase the amount of a solvent contained in the ink, or to reduce the crosslinking degree of the crosslinked substance when the ink contains a crosslinked substance.

The ink capable of changing its adhesiveness by the above-mentioned mechanism (3) essentially comprises a liquid dispersion medium and a crosslinked substance (inclusive of polyelectrolyte), as described above, and may further comprise, as desired, a colorant inclusive of dye, pigment and colored fine particles, a color-forming compound capable of generating a color under electric conduction, an electrolyte providing an electroconductivity or to the ink, or another additive such as an antifugal agent or an antiseptic.

The colorant or coloring agent may be any of dyes and pigments generally used in the field of printing and recording, such as carbon black.

Further, in order to enhance the rubbing resistance of the resultant image, fine particles of an inorganic compound such as colloidal silica, titanium oxide and tin oxide may be added to the ink.

The ink used in the present invention may be obtained from the above components, for example, by uniformly mixing a liquid dispersion medium such as water, a crosslinked substance such as a hydrophilic polymer and/or an polyelectrolyte, and also an optional additive such as a crosslinking agent, a colorant, an electrolyte, etc., under heating as desired, to form a viscous solution or dispersion, which is then cooled to be formed into a gel state.

Incidentally, when colored particles such as toner particles are used as a colorant, it is preferred that a crosslinked substance and/or an polyelectrolyte, and a liquid dispersion medium are first mixed under heating to form a uniform liquid, and then the colored particles are added thereto. In this case, it is further preferred that the addition of the particles is effected in the neighborhood of room temperature so as to avoid the agglomeration of the particles.

Hereinbelow, the present invention will be explained with reference to Examples.

EXAMPLE 1

200 g of glycerin and 40 g of lithium taeniolite ($LiMg_2Li(Si_4O_{10})F_2$) having an average particle size of 2.5 microns were kneaded in a homogenizer at 10,000 rpm for 30 min., and then 200 g of water was added thereto and mixed by means of a roll mill to prepare an amorphous gray ink.

Then, image formation was effected by means of a printing apparatus as shown in the accompanying drawing, wherein an ink-carrying roller 101 comprising a cylindrical roller of 30 mm in diameter having a surface stainless steel coated with platinum plating (surface roughness: 1S) and a first intermediate roller 105 comprising an iron cylindrical roller of 30 mm in diameter having a surface coated with hard chromium plating were used. In this apparatus, the above-mentioned ink material was disposed between the ink-carrying roller 101 and a first intermediate roller 105 to form an ink reservoir 103.

The ink-carrying roller 101 was rotated in the arrow A direction at a peripheral speed of 20 mm/sec, and the gap between the ink-carrying roller 101 and the coating roller 104 comprising a cylindrical roller having a teflon rubber surface and rotating in the arrow B direction at a peripheral speed of 20 mm/sec was controlled so that an about 0.2 mm-thick ink layer 2 was formed on the ink-carrying roller 101. When the first intermediate roller 105 was rotated in the arrow C direction at a peripheral speed of 20 mm/sec in contact with the ink layer 2 formed on the ink-carrying roller 101, a surface portion of the ink layer formed on the ink-carrying roller 101 was transferred to the first intermediate roller 105 to form thereon an ink layer 106 having a thickness of below 0.1 mm. Then, when the second intermediate roller 107 was rotated in the arrow D direction at a peripheral speed of 20 mm/sec in contact with the ink layer 106 formed on the first intermediate roller 105, a portion of the ink layer 106 formed on the first intermediate roller 105 was transferred to the second intermediate roller 107 to form thereon a thin ink layer 108 having a thickness of below 0.1 mm. The second intermediate roller 107 used herein was one surfaced with an electroconductive silicone rubber containing carbon powder.

Separately, a fluorine-containing polymer paint "FC-721" (mfd. by Sumitomo Three-Emu K.K.), as a liquid for forming a water-repellent coating film, was applied onto a polyamide film to form thereon a waterrepellent coating film having a thickness of about 1 micron. Onto the thus coated polyimide film, an electrophotographic toner (average particle size: 10 microns) predominantly comprising a polyamide resin was patternwise transferred and fixed by means of an ordinary electrophotographic copying machine (Trade name: PC-12, mfd. by Canon K.K.) to form a toner image on the polyimide film, whereby a printing plate 110 was obtained. The thus obtained printing plate 110 was wound about a plate roller 109 and rotated in the arrow E direction at a peripheral speed of 20 mm/sec in contact with the ink layer formed 108 formed on the second intermediate roller 107, whereby the ink was selectively transferred onto the above-mentioned toner image to form an ink pattern.

The thus formed ink pattern was then transferred to a blanket 112 wound about a blanket roller 111 rotating in the arrow F direction at a peripheral speed of 20 mm/sec in contact with the printing plate 110. The blanket 112 used herein was one surfaced with an electroconductive urethane rubber containing carbon powder.

Then, a pressure roller 113 surfaced with a silicone resin rotating in the arrow G direction at the same peripheral speed as that of the blanket roller 111 was disposed opposite to the blanket roller 111 by the medium of a recording medium 114 of plain paper moving in the arrow J direction. As a result, the same image as the above-mentioned toner image of the printing plate 110 was obtained on the recording medium 114.

The above-mentioned procedure was repeated to obtain 100 sheets of printed matters having thereon recorded images. The thus obtained recorded images were good so that they were sufficiently usable in practice.

Thereafter, the second intermediate roller 107 was caused not to contact the plate roller 109, and the second intermediate roller 107 was rotated at a peripheral speed of 5 mm/sec so as to effect five rotations, while applying a voltage of 50 V between the first intermediate roller 105 as an anode and the second intermediate roller 107 as a cathode, whereby all of the ink disposed on the second intermediate roller 107 was transferred to the first intermediate roller 105.

Then, the first intermediate roller 105 was caused not to contact the second intermediate roller 107, and the coating roller 104, first intermediate roller 105 and the ink-carrying roller 101 were rotated at a peripheral speed of 5 mm/sec in the same directions as those in the above-mentioned printing process while applying a voltage of 50 V between the first intermediate roller 105 as a cathode and the ink-carrying roller 101 as an anode, whereby all of the ink disposed on the first intermediate roller 105 was transferred to the ink-carrying roller 101.

Then, the printing plate 110 was removed from the plate roller 109 and the pressure roller 113 was caused not to contact the blanket 112. Further, the blanket 112 was caused to contact an ink layer for cleaning 117 comprising the same ink as described above which had not contacted the blanket 112, and the blanket roller 111, cleaning roller 115 and coating roller for cleaning 116 were all rotated at a peripheral speed of 5 mm/sec in the directions of arrows F, H and I, respectively, so that the blanket roller 111 effected five rotations, while applying a voltage of 50 V between the cleaning roller 115 as an anode and the blanket roller 111 as a cathode. As a result, all of the ink disposed on the blanket 112 was removed therefrom

EXAMPLE 2

600 g of glycerin, 300 g of water, 50 g of carbon black (pigment, Stering SR, mfd. by Cabot Co., U.S.A.), and 100 g of polyvinyl alcohol (Gohsenol KP08, mfd. by Nihon Gosei Kagaku Kogyo K.K.) were kneaded at 80° C. to dissolve the polyvinyl alcohol, and then 100 g of lithium taeniolite having an average particle size of 2.5 microns was added thereto and mixed by means of a roll mill to prepare an amorphous ink.

When the thus obtained ink was subjected to printing and cleaning in the same manner as in Example 1, similar results as in Example 1 were obtained.

EXAMPLE 3

| | |
|---|---|
| Colloidal silicate hydrate (swelling fine particles, trade name: Sumecton, mfd. by Kunimine Kogyo K.K., average particle size: below 1 micron) | 50 wt. parts |
| Methyl cellulose (water-soluble polymer, trade name: SM 4000, mfd. by Shinetsu Kagaku Kogyo K.K.) | 4 wt. parts |
| Water | 180 wt. parts |
| Glycerin | 20 wt. parts |
| Cyan dye (trade name: Supranol Cyan 7BF, mfd. by Bayer, West Germany) | 10 wt. parts |

Among the above-mentioned ingredients, water, glycerin and the dye were first mixed to prepare a mixture liquid, and then colloidal silicate hydrate was mixed therewith by means of a kneader to obtain an ink.

When the thus obtained ink was subjected to printing and cleaning by using the same printing apparatus as in Example 1 in the same manner as in Example 1, similar results as in Example 1 were obtained.

EXAMPLE 4

| | |
|---|---|
| Water | 90 wt. parts |
| Polyvinyl alcohol (Gohsenol GL-03, mfd. by Nihon Gosei Kagaku Kogyo K.K.) | 30 wt. parts |

The above ingredients were uniformly mixed under heating at 80° C. to dissolve the polyvinyl alcohol. To the resultant mixture, 10 wt. parts of carbon black (Stering SR, mfd. by Cabot Co., U.S.A.) was added and mixed under stirring, and then 0.4 wt. part of titanium triethanol aminate (isopropyl alcohol content: 20 %, trade name: Orgatix TC 400, available from Matsumoto Kosho K.K.) was further added as a crosslinking component and mixed under stirring to obtain an ink.

When the thus obtained ink was subjected to printing and cleaning in the same manner as in Example 1, similar results as in Example 1 were obtained.

EXAMPLE 5

| | |
|---|---|
| Glycerine | 250 wt. parts |
| Polyvinyl alcohol (Gohsenol GL-03, mfd. by Nihon Gosei Kagaku Kogyo K.K.) | 60 wt. parts |

The above ingredients were uniformly mixed under heating at 80° C. to dissolve the polyvinyl alcohol. To the resultant mixture, 10 wt. parts of carbon black (Stering SR, mfd. by Cabot Co., U.S.A.) and 50 wt. parts of lithium borofluoride ($LiBF_4$, electrolyte) were added and mixed under stirring, and then 25 wt. parts of boric acid ($H_3BO_3$) was further added as a crosslinking component and mixed under stirring to obtain an ink.

When the thus obtained ink was subjected to printing and cleaning in the same manner as in Example 1 except that all of the polarities of voltages applied to the respective rollers were reverse to those used in Example 1, similar results as in Example 1 were obtained.

As described hereinabove, according to the present invention, an ink remaining in respective portions of an image forming apparatus after the completion of image formation may easily be removed without manual operations.

Further, the cleaning step according to the present invention is also applicable to ink cleaning in a portion wherein an ink residue can occur, in addition to the above-mentioned ink cleaning. For example, the cleaning method according to the present invention can be used in a case where an ink attached to the non-image portion of a printing plate is removed.

What is claimed is:

1. An image forming method comprising the steps of:
   providing an adhesive ink, said ink characterized in that its adhesiveness is reduced by application of a voltage and is changed corresponding to the polarity of the voltage applied thereto;
   subjecting the ink to image formation by means of an image forming apparatus comprising at least a pair of electroconductive members, while leaving a residual ink between the pair of electroconductive members; and
   applying a voltage to the residual ink so as to reduce the adhesiveness of the ink disposed on one of the pair of electroconductive members, thereby to transfer the ink from one of said electroconductive members to the other of the pair of electroconductive members.

2. A method according to claim 1, wherein said image forming apparatus comprises a printing plate for image formation.

3. A method according to claim 2, wherein said printing plate comprises an electroconductive portion and an insulating portion, and the adhesiveness of the ink disposed on the electroconductive portion is reduced and the ink is selectively attached to the insulating portion under the application of a voltage.

4. A method according to claim 1, wherein the adhesiveness of the ink disposed on a cathode side is reduced under the application of the voltage.

5. A method according to claim 1, wherein the adhesiveness of the ink disposed on an anode side is reduce under the application of the voltage.

6. A method according to claim 1, wherein said ink contains water.

7. An image forming apparatus comprising cleaning means, said cleaning means comprising at least a pair of electroconductive members for carrying thereon an ink, and a power supply for applying a voltage between said pair of electroconductive members; said cleaning means for transferring an ink disposed on one of the pair of electroconductive members to the other one of said cleaning means for transferring an ink disposed on one of the pair of electroconductive members to the other one of said pair of electroconductive members under the application of the voltage.

8. An apparatus according to claim 7, wherein said electroconductive member comprises a roller.

* * * * *

UNITED STATES PATENT AND TRADEMARK OFFICE

CERTIFICATE OF CORRECTION

PATENT NO. : 4,972,200

DATED : November 20, 1990

INVENTOR(S) : Kohzoh ARAHARA, ET AL.

It is certified that error appears in the above-identified patent and that said Letters Patent is hereby corrected as shown below:

At [57] ABSTRACT:

Line 1, "disclosed an" should read --disclosed. An--.

Line 7, "by; and" should read --by--.

COLUMN 1:

Line 47, "process," should read --processes,--.

COLUMN 2:

Line 5, "an" should be deleted.

COLUMN 4:

Line 17, "second intermediate roller 07," should read --second intermediate roller 107,--; and Line 37, "o" should read --on--.

UNITED STATES PATENT AND TRADEMARK OFFICE

CERTIFICATE OF CORRECTION

PATENT NO. : 4,972,200

DATED : November 20, 1990

INVENTOR(S) : Kohzoh ARAHARA ET AL.

It is certified that error appears in the above-identified patent and that said Letters Patent is hereby corrected as shown below:

COLUMN 7:

Line 5, start a new paragraph at "(1) Adhesiveness";

Line 18, start a new paragraph at "(2) Adhesiveness";

Line 34, start a new paragraph at "(3) Adhesiveness";

Line 42, "30 30" should read --+30--;

Line 45, "plate" should read --plates--; and

Line 56, "electrode," should read --electrodes,--.

COLUMN 10:

Line 3, "its" should read --their--; and

Line 31, "in" should read --is--.

COLUMN 11:

Line 54 "o" should read --or--.

COLUMN 13:

Line 10, "waterrepellent" should read --water repellent--.

UNITED STATES PATENT AND TRADEMARK OFFICE

CERTIFICATE OF CORRECTION

PATENT NO. : 4,972,200

DATED : November 20, 1990

INVENTOR(S) : Kohzoh ARAHARA ET AL.

It is certified that error appears in the above-identified patent and that said Letters Patent is hereby corrected as shown below:

COLUMN 14:

Line 10, "therefrom" should read --therefrom.--.

COLUMN 16:

Line 35, entire line should be deleted;

Line 36, entire line should be deleted; and

Line 37, "one of said" should be deleted.

Signed and Sealed this

Ninth Day of July, 1991

Attest:

HARRY F. MANBECK, JR.

*Attesting Officer*

*Commissioner of Patents and Trademarks*